(12) United States Patent
Wang et al.

(10) Patent No.: US 11,440,512 B2
(45) Date of Patent: Sep. 13, 2022

(54) DOUBLE-LIFTING DEVICE FOR TOWING TYPE TRAVELING VEHICLE

(71) Applicant: HANGZHOU HENGHONG MACHINERY CO., LTD., Hangzhou (CN)

(72) Inventors: Guozhong Wang, Hangzhou (CN); Laiming Yu, Hangzhou (CN); Jigang Yan, Hangzhou (CN); Jinming Shi, Hangzhou (CN); Jiangqiang Lu, Hangzhou (CN); Feng Tian, Hangzhou (CN); Congcong Wang, Hangzhou (CN); Lingling Wang, Hangzhou (CN)

( * ) Notice: Subject to any disclaimer, the term of this patent is extended or adjusted under 35 U.S.C. 154(b) by 516 days.

(21) Appl. No.: 16/600,481

(22) Filed: Oct. 12, 2019

(65) Prior Publication Data

US 2020/0361426 A1 Nov. 19, 2020

(30) Foreign Application Priority Data

May 16, 2019 (CN) .......................... 201920698372.4

(51) Int. Cl.
| | |
|---|---|
| *F16H 1/22* | (2006.01) |
| *B60S 9/08* | (2006.01) |
| *F16D 15/00* | (2006.01) |
| *F16H 25/20* | (2006.01) |

(52) U.S. Cl.
CPC ................ *B60S 9/08* (2013.01); *F16D 15/00* (2013.01); *F16H 1/222* (2013.01); *F16H 25/20* (2013.01); *F16H 2025/2084* (2013.01)

(58) Field of Classification Search
CPC . B60S 9/08; F16D 15/00; F16H 1/222; F16H 25/20; F16H 2025/2084
See application file for complete search history.

(56) References Cited

U.S. PATENT DOCUMENTS

2006/0061078 A1* 3/2006 Baxter ...................... B60S 9/08
280/763.1
2008/0315570 A1* 12/2008 Baxter ...................... B60S 9/06
280/766.1

* cited by examiner

*Primary Examiner* — David J Hlavka
(74) *Attorney, Agent, or Firm* — W&K IP

(57) ABSTRACT

A double-lifting device for a towing type traveling vehicle, has an active leg, a driven leg, a transmission member, a geared motor, a gear reduction structure, a first reverse gear reduction structure, and a second reverse gear reduction structure; the geared motor, the gear reduction structure, and the first reverse gear reduction structure are sequentially and drivably connected; the output end of the gear reduction structure is also used to drive the transmission member, and the transmission member is used to drive the second reverse gear reduction structure. The double-lifting device is able to achieve synchronous lifting and lowering. With a simple structure, ifs stable, easy to operate, and provides mechanical overload protection.

19 Claims, 7 Drawing Sheets

DOUBLE-LIFTING DEVICE FOR TOWING TYPE TRAVELING VEHICLE

CROSS-REFERENCE TO RELATED APPLICATIONS

This application claims priority to Chinese Patent Application No. 201920698372.4 with a filing date of May 16, 2019. The content of the aforementioned applications, including any intervening amendments thereto, are incorporated herein by reference.

TECHNICAL FIELD

The invention relates to the technical field of jacking and lifting devices, and in particular, to a double-lifting device for a towing type traveling vehicle.

BACKGROUND

At present, the towing type B traveling vehicles at various countries have an unloaded weight of 4.5 to 6.5 tons without any suspension or other accessories, and the cargo capacity is mostly 1.6 to 2.4 tons. The full load weight (excluding suspension) of some towing type models can reach 8.6 tons or so. As a result, the load capacity requirement for auxiliary support is much larger than that of the towing type A.

For this reason, when the length of the vehicle reaches 10.5 to 13 meters, the trailer head is far away from the wheel, and it is necessary to provide two left and right supports at the front of the vehicle to ensure the stability of the vehicle body during daily life and leisure activities on the traveling vehicle.

When the pickup truck is driven away, the supporter is required to provide support to the trailer on the front side. The existing electric lifting devices are mostly scissor jack structures, which have poor support stability and are easy to tip over. The requirements for the brake system of the motorhome are high, and hand-held electric components are mostly used for electric lifting. It is difficult to operate it and may not achieve synchronized lifting or an enough lifting height.

Moreover, after overloading, mechanical overload protection cannot be realized. Even if conventional thermal protection, fuses, etc. are used to cut off the motor power, real-time and accurate protection is not allowed

SUMMARY

The technical problem to be solved by the invention is to provide a double lifting device for a towing type traveling vehicle which realizes synchronous lifting, has a simple and stable structure, operates more easily, and allows mechanical overload protection.

A technical solution of the present invention discloses a double-lifting device for a towing type traveling vehicle, comprising an active leg, a driven leg, a transmission member, a geared motor, a gear reduction structure, a first reverse gear reduction structure, and a second reverse gear reduction structure. The geared motor, the gear reduction structure, and the first reverse gear reduction structure are sequentially and drivably connected. The output end of the gear reduction structure is also used to drive the transmission member, and the transmission member is used to drive the second reverse gear reduction structure. A leg structure involved in the active leg and the driven leg includes a fitting tube, a lifting tube, a grounding member, and a screw pair. The fitting tube is used to fit the geared motor, the gear reduction structure and the first reverse gear reduction structure. A screw of the screw pair is connected to an output end of the first reverse gear reduction structure to realize a rotation of the screw itself. A nut of the screw pair is used for connecting the lifting tube to perform lifting movement of the lifting tube relative to the fitting tube. The grounding member is detachably connected to the lifting tube for ground support, and the geared motor has an overrunning clutch for gear transmission overload protection. The double-lifting device for the trailer type traveling vehicle of the invention can realize synchronous lifting by using the active supporting leg and the driven supporting leg, and can realize mechanical overload protection under the action of the overrunning clutch as well as real-time, accurate protection.

In the double-lifting device, the transmission member comprises a first tube member and a second tube member, the first tube member and the second tube member are nested with each other and the length adjustment of the transmission member is realized in a pulling manner. With the fitting of the tube fittings, the mutual pulling between the two can be realized to achieve the adjustment of the overall length of the transmission member, thereby adapting to different vehicle widths.

In the double-lifting device, the geared motor comprises a motor and a reducer drivably connected to an output end of the motor, and the overrunning clutch is disposed in the reducer. The overrunning clutch is disposed at the output end of the motor, and the mechanical overload protection of the subsequent reduction structure from the source further ensures real-time performance.

Further, the overrunning clutch comprises a mandrel connected to the output end of the motor and a clutch structure and a power output gear socketed on the mandrel. The clutch structure includes a power input gear, a steel ball, and a compression spring assembly. The compression spring assembly includes a compression spring and a fastening member for locking the compression spring on the mandrel. The steel ball is placed between the compression spring and the power input gear to press the power input gear under the action of the compression spring.

Therefore, the overrunning clutch of the mechanical overload protection has much less overall components than the prior arts, and it has the characteristics of few components. The overall structure is compact and reasonable. As the compression spring directly acts on the steel ball, overload protection is more sensitive and reliable. The steel ball is directly pressed onto the power input gear, so it makes the structure more compact, more sensitive and reliable in overload protection.

In some embodiments, a ball holder socketed on the mandrel is arranged between the compression spring and the power input gear. The ball is placed in the ball holder, and the ball protrudes from the ball holder at both ends. It facilitates fixing of the ball and avoids disorderly movement of the steel ball, and further ensures the reliability of the overload protection.

In some embodiments, the fastening member is configured as a nut sleeve screwed with the mandrel. The outer peripheral portion of the nut sleeve has a limiting step to limit the fixing, end of the compression spring. The nut sleeve is screwed to the mandrel, so locking is more reliable and not easy to loosen. The limiting step can realize reliable and firm limit fastening of the fastening end of the compression spring. The screwing of the nut sleeve enables the compression spring to be securely locked to the mandrel.

Further, the compression spring is a hollow cone structure having an outer diameter of the fastening end smaller than an outer diameter of the pressing end. The compression spring of the structure has a good pressing potential, which further ensures the reliability of the pressing In some embodiments, the end of the power input gear has a female recess to be matched with a part of the steel ball extending from the ball holder to fit the steel ball. The overload protection and the reliable operation are further enabled.

In some embodiments, the end of the power input gear further has a plurality of arcuate chutes connected to the female recess, and the plurality of arcuate chutes are arranged in an annular array centering on the mandrel. After overload protection, the steel ball can run along the arcuate chute so that it can smoothly enter the female recess connecting with the arcuate chute during normal operation.

Further, the end of the power input gear has a cavity, and the edge of the cavity is adjacent to the outer edge portion of the power input gear. The arrangement of the cavity provides an effective fitting space for the steel ball, the steel ball holder and the compression spring, which effectively reduces the axial length of the entire clutch structure so that the axial length of the clutch using the clutch structure is further shortened. The structure can be optimized, simple and compact In some embodiments, the power input gear is axially restrained and sleeved on the mandrel. The axial direction of the power input gear is limited, but the circumferential direction is not limited. The mandrel is free to rotate, and under normal operation, the mandrel is synchronously rotated to transmit the rotation.

In some embodiments, the gear reduction structure comprises a fitting box mounted on the fitting tube, a first transmission shaft rotatably mounted on the fitting box and drivingly connected to the output end of the reduction motor, and a first gear set on the first transmission shaft and a second gear that meshes with the first gear. The entire structure is simple and compact Further, the first reverse gear reduction structure comprises a second transmission shaft arranged on the fitting tube for mounting the second gear, a first bevel gear mounted at one end of the second transmission shaft, and a second bevel gear that engages the first bevel gear. The second transmission shaft extends beyond the other end of the second gear for mounting the transmission member. The second bevel gear is mounted on the top of the corresponding screw to drive the screw to rotate. By reversing the bevel gear, the screw can realize its own rotation, and has the characteristics of compact structure and reasonable layout.

In some embodiments, the second reverse gear reduction structure comprises a third transmission shaft connected to the transmission member a third bevel gear mounted on the third transmission shaft, and a fourth bevel gear meshed with the third bevel gear, and the fourth bevel gear is mounted on the top of the corresponding screw to drive the screw to rotate. The bevel gear is similarly used for the reversion to have the screw rotate by itself. It has the characteristics of a compact structure and a reasonable layout.

In some embodiments, the grounding member, the lifting tube and the fitting tube are all hollow tube members and are sequentially fitted from inside to outside to achieve overall stretching. They are easy to stretch and have excellent stretching ability.

In some embodiments, the fitting tube has a mounting seat for the corresponding screw to be arranged on rotatably. The mounting seat is disposed on the fitting tube, and the screw is mounted on the mounting seat, which suggests the screw is arranged on the fitting tube as well is to support the second bevel gear, the fourth bevel gear and the corresponding screw.

In some embodiments, the grounding member and the lifting tube are detachably connected through positioning pull pins and pin holes provided on the grounding member and the lifting tube respectively. The disassembly and assembly can be realized by a pull of the positioning pull pin, which is convenient and fast.

In some embodiments, the exposed end of the first transmission shaft is detachably fitted with a hand crank. The arrangement of the hand crank can also achieve synchronous lifting. Electrically powered or manually executed operation of the double-lifting device of the present invention can decided in a preferred manner.

In some embodiment, the bottom end of the grounding member has a radially expanding support base, and the grounding member and the support base are detachably connected. The support base is radially expanded to provide a large grounding area. The support can be more reliable, and more convenient disassembly and assembly may be fulfilled according to the needs.

BRIEF DESCRIPTION OF THE DRAWINGS

The embodiments of the present invention are described in detail, by way of non-limiting examples. It should be noted that the various features and structures of the various figures are not necessarily representative of the actual shapes and dimensions of the corresponding components and elements, but are merely illustrative of the principles of the embodiments of the invention.

Figure 1:
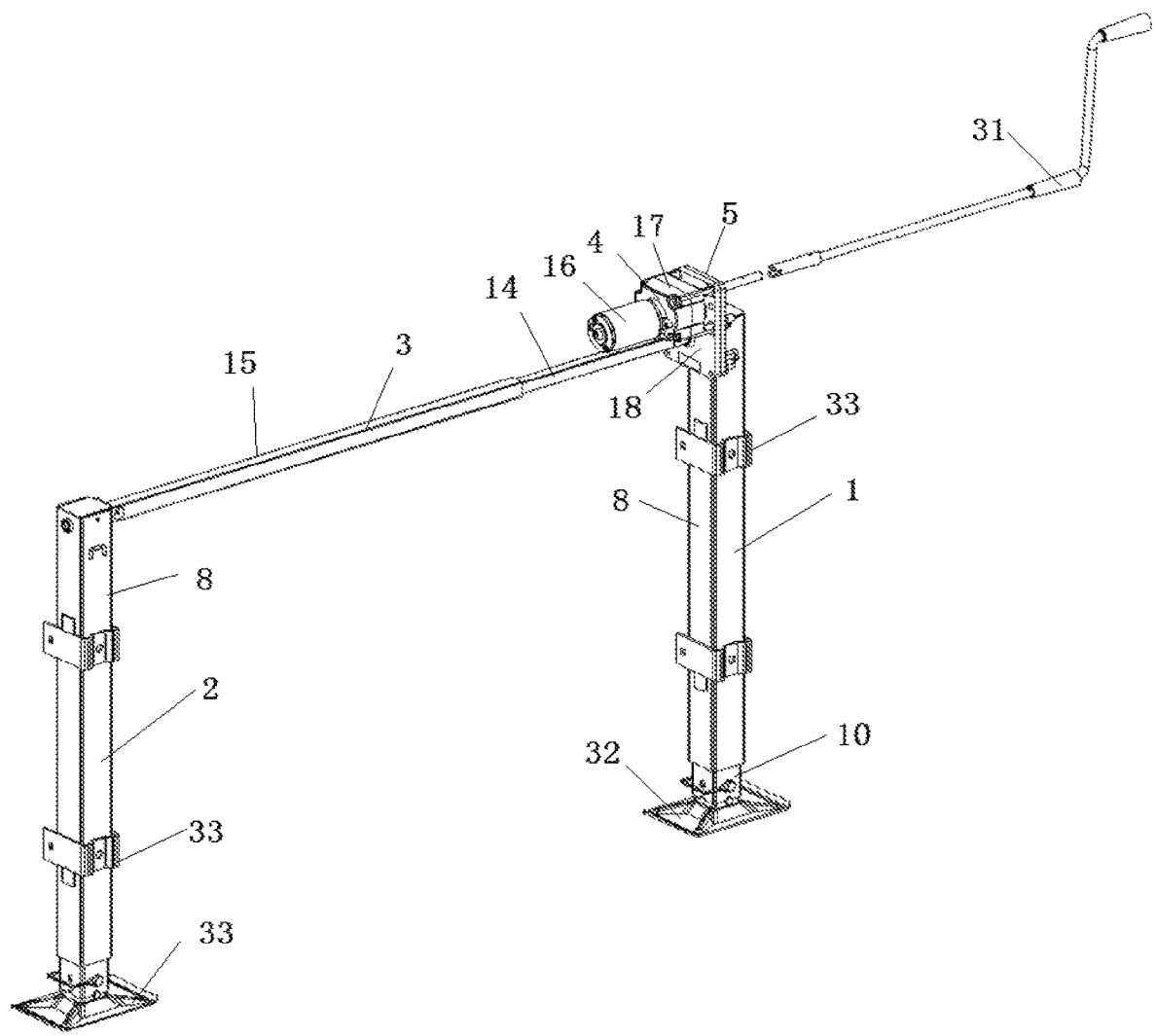
FIG. 1 is a schematic view showing the retracted structure of a double-lifting device for a towing type traveling vehicle according to the present invention.
Figure 2:
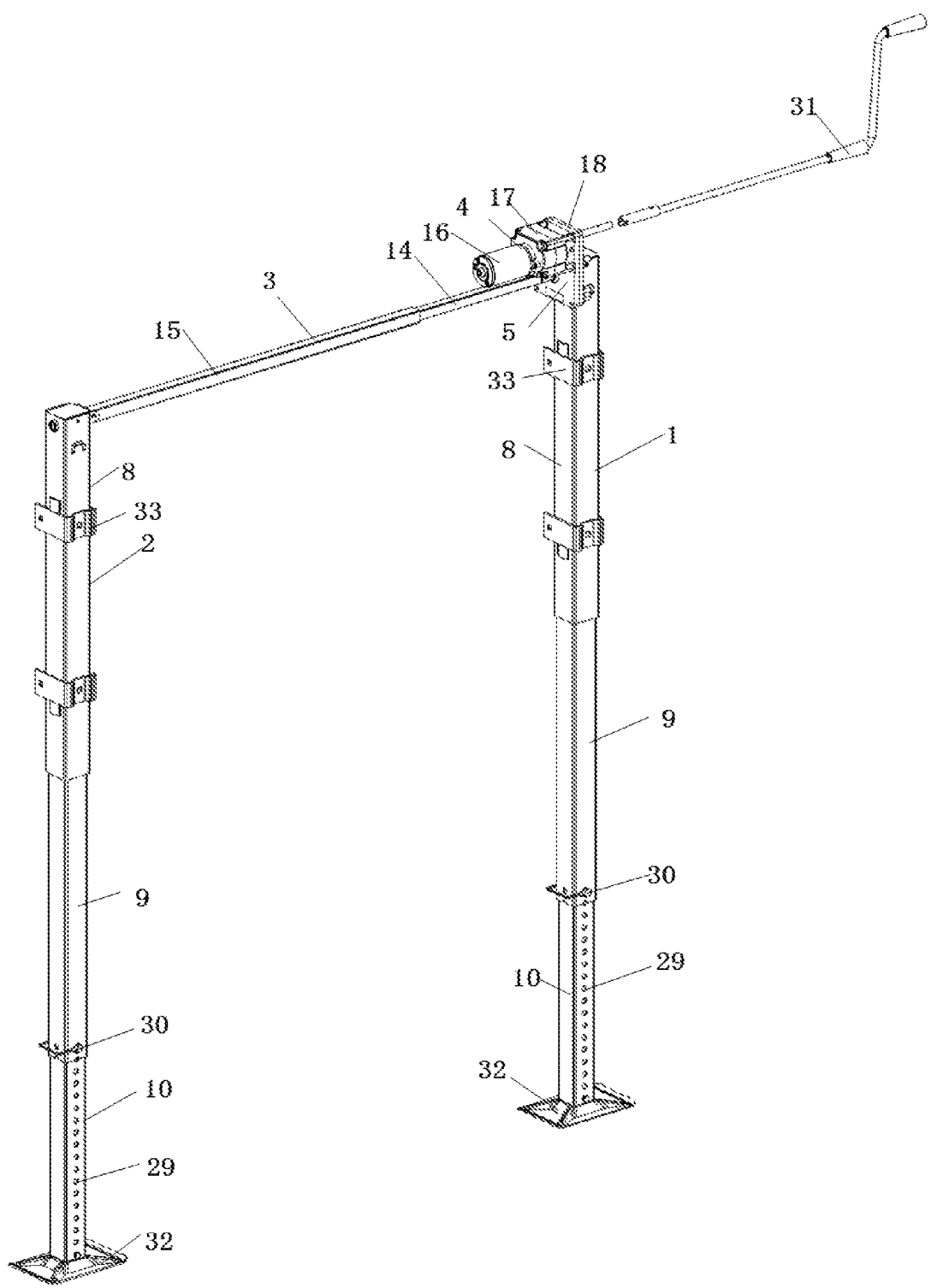
FIG. 2 is a schematic view showing the lifted structure of a double-lifting device for the towing type traveling vehicle according to the present invention.
Figure 3:
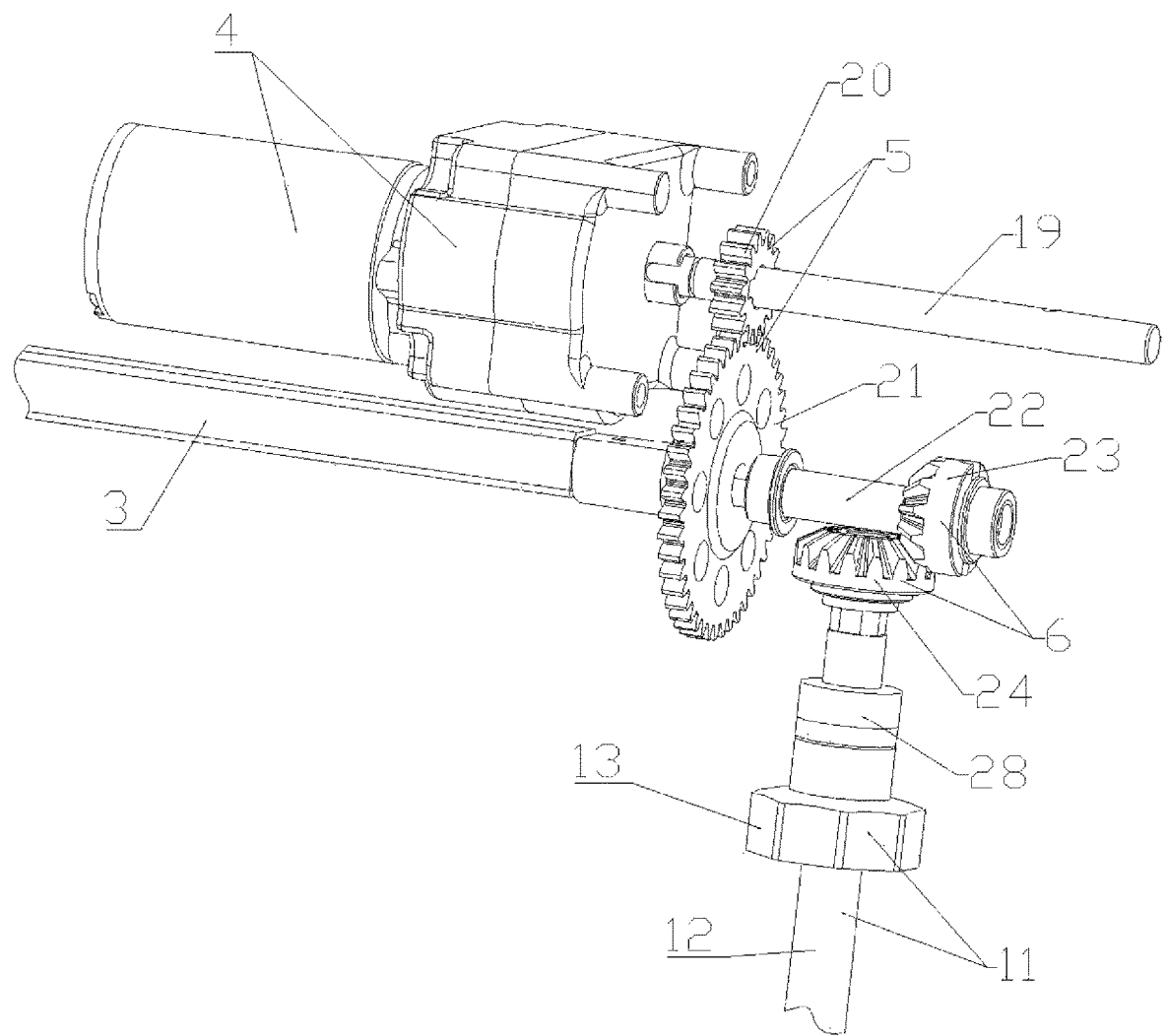
FIG. 3 is a partial structural schematic view of the active leg side of the double-lifting device for the towing type traveling vehicle of the present invention.
Figure 4:
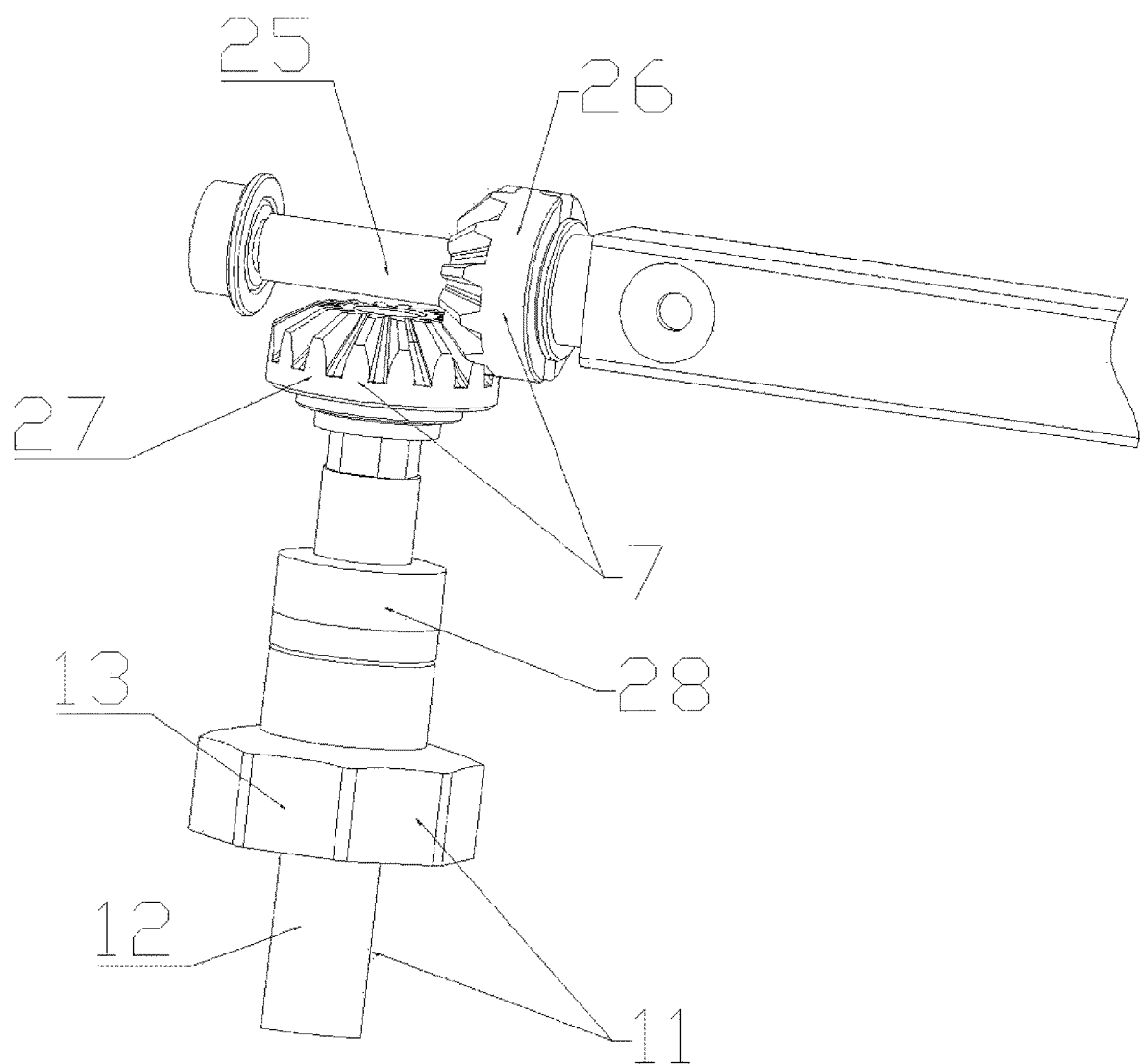
FIG. 4 is a schematic view showing the structure of the driven leg side of the double-lifting device for the towing type traveling vehicle of the present invention.

REFERENCE NUMBERS 1 active leg, 2 driven leg, 3 transmission member, 4 geared motor, 5 gear reduction structure, 6 first reverse gear reduction structure, 7 second reverse gear reduction structure, 8 fitting tube, 9 lifting tube, 10 grounding member, 11 screw pair, 12 screw, 13 nut, 14 first tube member 15 second tube member, 16 motor, 17 reducer, 18 fitting box, 19 first transmission shaft, 20 first gear, 21 second gear, 22 second transmission shaft, 23 first bevel gear, 24 second bevel gear, 25 third transmission shaft, 26 third bevel gear, 27 fourth bevel gear, 28 mounting set, 29 pin holes, 30 positioning pull pin, 31 hand crank, 32 support base, 33 connection plate body.

101 mandrel, 102 power output gear, 103 power input gear, 104 steel ball, 105 compression spring, 106 fastening member, 107 steel ball holder, 108 female recess, 109 arcuate chutes, 110 cavity.

DETAILED DESCRIPTION

Hereinafter, specific embodiments of the present invention will be described in detail by way of examples.

The drawings are to be regarded as illustrative only and not drawn to scale. It is also to be understood that the same reference refer to the same or similar parts throughout the drawings.

It should be understood that the embodiments of the present invention are not limited to the examples exemplified below, and those skilled in the art may make modifications and variations to the embodiments described herein. It is apparent that these embodiments are all within the scope of the claimed invention.

In addition, it is to be noted that the drawings referred to herein are for the purpose of illustrating and explaining the embodiments of the present invention. The shapes and dimensions of each component and the connections between the different components are only for illustrative purposes of the embodiments of the present invention and are not intended to limit the scope of the present invention.

As shown in FIGS. 1, 2, 3 and 4, the present invention provides a double lifting device for a towing type traveling vehicle, comprising an active leg 1, a driven leg 2, a transmission member 3, a geared motor 4, a gear reduction structure 5, a first reverse gear reduction structure 6, and a second reverse gear reduction structure 7.

The geared motor 4, the gear reduction structure 5, and the first reverse gear reduction structure 6 are sequentially and drivably connected.

The output end of the gear reduction structure 5 is also used to drive the transmission member 3, and the transmission member 3 is used to drive the second reverse gear reduction structure 7.

The geared motor 4 comprises a motor 16 and a reducer 17 drivably connected to an output end of the motor 16, and the overrunning clutch is disposed in the reducer 17.

A leg structure involved in the active leg 1 and the driven leg 2 includes a fitting tube 8, a lifting tube 9, a grounding member 10, and a screw pair 11.

The fitting tube 8 is used to fit the geared motor 4, the gear reduction structure 5 and the first reverse gear reduction structure 6.

A screw 12 of the screw pair 11 is connected to an output end of the first reverse gear reduction structure 6 to realize a rotation of the screw 12 itself, a nut 13 of the screw pair 12 is used for connecting the lifting tube 9 to perform lifting movement of the lifting tube 9 relative to the fitting tube 8.

The grounding member 10 is detachably connected to the lifting tube 9 for ground support; and the geared motor 4 has an overrunning clutch for gear transmission overload protection.

The gear reduction structure 5 includes a fitting box 18 mounted on the fitting tube 8, a first transmission shaft 19 rotatably mounted on the fitting box 18 and drivingly connected to the output end of the reducer 17 of the geared motor 4, a first gear 20 disposed on the first transmission shaft 19, and a second gear 21 meshed with the first gear 20.

In the present embodiment, the fitting box 18 and the first transmission shaft 19 are erected, whereby the entire gear reduction structure 5 is erected.

The first reverse gear reduction structure 6 includes a second transmission shaft 22 that is mounted on the fitting tube 8 for mounting to the second gear 21, a first bevel gear mounted on one end of the second transmission shaft 22, and a second bevel gear 24 meshing with the first bevel gear 23. The second transmission shaft 22 extends from the other end of the second gear 21 for mounting the transmission member 3. The second bevel gear 24 is mounted on the top of the corresponding screw 12 to drive the screw 12 to achieve rotation.

In this embodiment, the second transmission shaft 22 is disposed in a horizontal state, the first bevel gear 23 is erected, and the second bevel gear 24 is disposed in a horizontal state. Hence the screw 12 fitted with the second bevel gear 24 can be placed in an upright state to achieve its own rotation and drive the nut 13 that is screwed with it by thread to achieve linear motion in the up or down direction.

The second reverse gear reduction structure 7 includes a third transmission shaft 25 coupled to the transmission member 3, a third bevel gear 26 mounted on the third transmission shaft 25, and a fourth bevel gear meshed with the third bevel gear. The fourth bevel gear 27 is mounted on the top of the corresponding screw 12 to drive the screw 12 to rotate. In the embodiment, the first reverse gear reduction structure 6 and the second reverse gear reduction structure 7 are symmetrically arranged in a left-right direction, and the active leg 1 and the driven leg 2 are also symmetrically arranged in a left-right direction.

The transmission member 3 includes a first tube member 14 and a second tube member 15, and the first tube member 14 and the second tube member 15 are fitted to each other so that the length adjustment of the transmission member 3 is realized in a pulling manner. That is to say, after the sleeve ends of the two tube fittings are joined in a nested manner, the relative pulling can be conveniently realized to change the length of the transmission member 3, and the double-lifting device of the invention can adapt to models of multiple types of widths, which improves the general performance of the double-lifting device. In this embodiment, after the two tube members are assembled together, one of the tube members is mostly sleeved in the other tube member, that is, the length of the nested structure is long. Because the widths of different models are not very different, even if a limit structure is not provided at the joint of the two tube members, the two tube members will not be completely pulled apart and separated considering the drawn length is not very long.

The grounding member 10, the lifting tube 9 and the fitting tube 8 are all hollow tube members and are sequentially assembled inside, all of which are tube members. Firstly, the nested structure is more convenient, and secondly, with the rotation of the screw shaft 12, the lifting tube 9 can have more smooth lifting movements.

A mounting seat 28 is disposed in the fitting tube 8 for the rotation of the corresponding screw 12, and it can be understood that the mounting seat 28 is fixedly coupled to the inner wall of the fitting tube 8, thereby providing support by the screw 12 and the first reverse gear reduction structure 6 after the screw 12 is installed in the mounting seat 28. This ensures the transmission connection between the screw 12 and the second bevel gear 24.

The grounding member 10 and the lifting tube 9 are detachably connected by positioning pull pins 30 and pin holes 29 provided on each of them.

The exposed end of the first transmission shaft 19 has a hand crank 31 detachably fitted.

The bottom end of the grounding member 10 is provided with a radially expanding support base 32, and the grounding member 10 is detachably connected to the support base 32. In this embodiment, the manner of the detachable connection is also preferably realized by a structure of pin holes and positioning pull pins.

In the double-lifting device of the present invention, the active leg 1 and the driven leg 2 are connected to the vehicle body through a connection plate body 33 disposed on the outermost fitting tube 8, thereby realizing the connection of the entire double-lifting to the vehicle body.

In actual use, it is preferably powered by a 12-volt motor 16, which is decelerated via a reducer 17 (including a reduction gear body and various reduction gears disposed therein), a gear reduction structure 5, and then transmitted to the active leg 1. The second transmission shaft 22 transmits the rotational motion to the driven leg 2 via the transmission member 3 to achieve synchronous rotation. The rotation directions of inner parts of each leg are changed by the respective reverse gear reduction structure (i.e., the bevel gear pair), and finally the power is transmitted to the corresponding screw. The screw pair converts the rotary motion into the lifting movement of the lifting tube 9 and the like, thereby achieving synchronous lifting movement of the double lifting device. When the traveling vehicle is unable to provide power, the lifting motion of the device can be manually operated via the hand crank.

Figure 5:
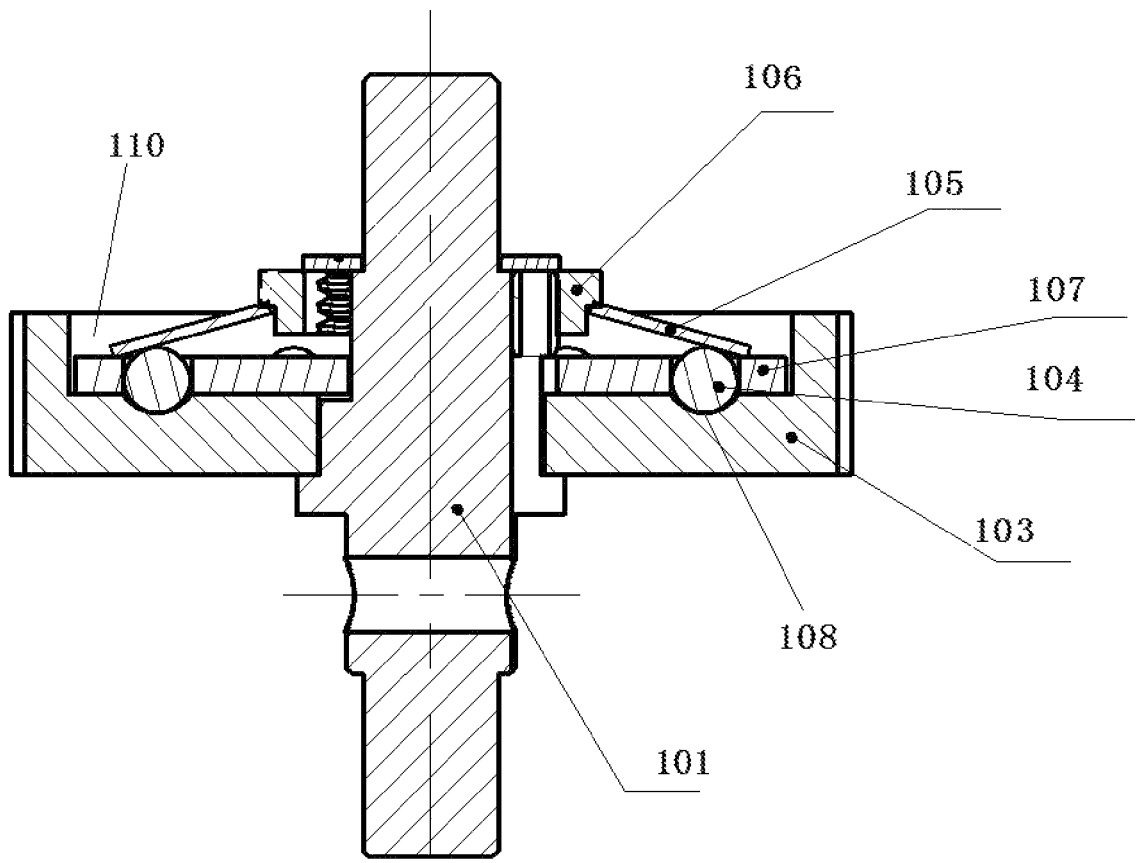
FIG. 5 is a partial cross-sectional structural view showing the overrunning clutch of the double-lifting device for the towing type traveling vehicle of the present invention (the power output gear is not shown).
Figure 6:
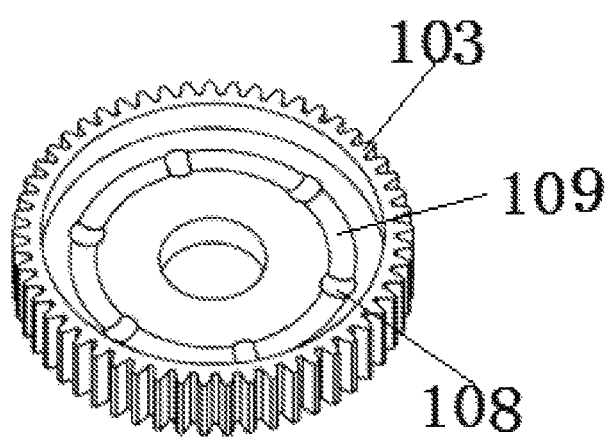
FIG. 6 is a schematic structural view of a power input gear of an overrunning clutch of a double-lifting device for the towing type traveling vehicle according to the present invention.
Figure 7:
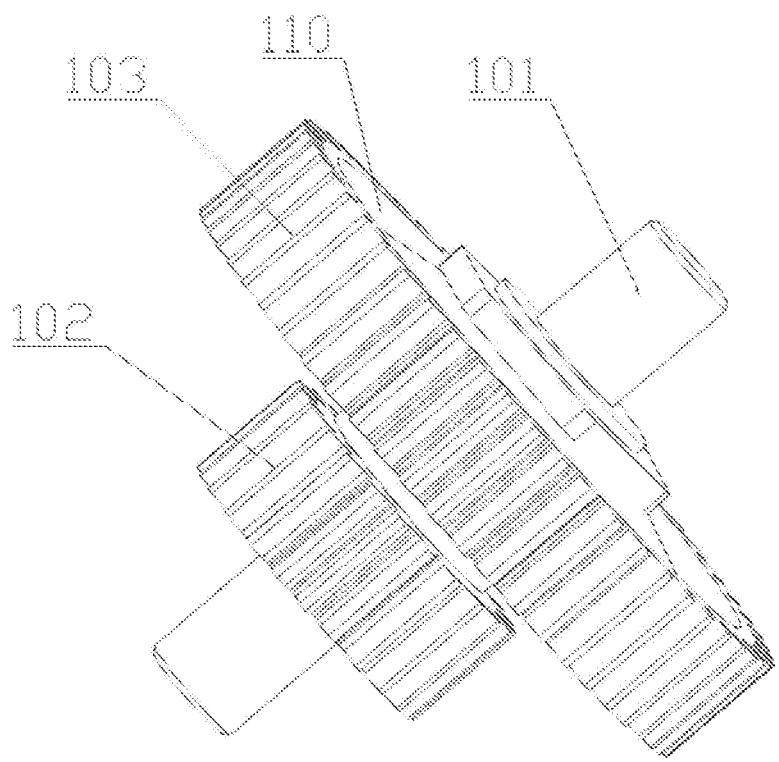
FIG. 7 is a schematic view showing the axial measuring structure of the overrunning clutch of the double-lifting device for the towing type traveling vehicle of the present invention.

In the embodiment shown in FIGS. 5-7, the overrunning clutch includes a mandrel 101 that is drivingly coupled to the output end of the motor 16, power output gear 102 and a clutch structure that is sleeved on the mandrel 101. The clutch structure includes a power input gear 103, a steel ball 104 and a compression spring assembly.

The compression spring assembly includes a compression spring 105 and a fastening member 106 for locking the compression spring 105 to the mandrel 101.

The steel ball 104 is placed between the compression spring 105 and the power input gear 103 to press the power input gear 103 under the action of the compression spring 105.

A ball holder 107 that is sleeved on the mandrel 101 is further disposed between the compression spring 105 and the power input gear 103. The steel ball 104 is placed in the ball holder 107, and the steel ball 104 protrudes from the two ends of the ball holder 107.

The fastening member 106 is configured as a nut sleeve that is screwed into the mandrel 101. The outer peripheral portion of the nut sleeve has a limiting step to limit the fixing end of the compression spring 105.

It should be understood that the power input gear 103 is used to receive the transmission of the output end of the motor 16, that is, the power input gear 103 is disposed at the output end of the motor 16, thereby transmitting the rotation of the output end of the motor 16. The power output gear 102 is used to drive the other reduction gears of the reducer 17 by gear meshing.

The compression spring 105 is a hollow cone structure having a fastening end with an outer diameter smaller than an outer diameter of the pressing end.

The end of the power input gear 103 has a female recess 108 that matches the portion of the steel ball 104 that extends beyond the ball holder 107 to fit the steel ball 104.

The end portion of the power input gear 103 is further provided with a plurality of arcuate chutes 109 connecting with the female recesses 108, and the plurality of arcuate chutes 109 are arranged in an annular array centered on the mandrel 101. In the present embodiment, the number of the female recesses 108 is preferably six, and the number of the arcuate chutes 109 is preferably six. The word "plurality" can be understood as two or more.

The end of the power input gear 103 has a cavity 110, and a side of the cavity 110 is close to an outer edge portion of the power input gear 103.

The power input gear 103 is axially restrained on the mandrel 101.

The following describes how to implement mechanical overload protection.

In normal transmission operation, the connection between power input gear and the mandrel are equivalent to a fixed connection.

During normal transmission operation, the compression spring presses all the steel balls by a pre-existing pressure of the fastened fastening member, so that the steel ball can exert the thrust on the inner recess of the power input gear under the reaction force of the steel ball positioning member. In turn, the power input gear and the mandrel are synchronously rotated. Meanwhile, the connection of the two is equivalent to a fixed connection. The rotation or the power can be transmitted.

After overload, the wheel body (not shown) driven by the power output gear would require a very large torque to finally jack up the excessive load. But since the torque is large, the steel ball needs a larger compression spring. The pressing force of the compression spring has been preset at the beginning, and the overload pressure would not be available. The compression spring is elastically deformed and pushed up at this moment. Without the pressing state provided by the original fixed position of the compression spring, the steel ball would escape from the female recess of the power input gear and enters the arcuate chute. At this moment, the thrust of the steel ball to the female recess inside the power input gear disappears, and the power input gear is no longer in fixed connection with the mandrel and rotates freely around mandrel instead. Hence the rotation and the power cannot be transmitted.

When the power input gear slides over one-sixth of a turn in the embodiment (depending on the number of female recesses, in this embodiment, six female recesses and six arcuate chutes are present), the steel ball will fall into the next recessed groove. If the overload state is no more, the preload of the compression spring will be sufficient, and the steel ball will not escape from the female recess, so that the power input gear and the mandrel are fixed relative to each other to transmit the rotation.

As a result, mechanical overload protection is achieved. It effectiveness and sensitivity can be high. Accuracy is improved, and effective overload protection can be obtained.

We claim:

1. A double-lifting device for a towing type traveling vehicle, comprising: an active leg (1), a driven leg (2), a transmission member (3), a geared motor (4), a gear reduction structure (5), a first reverse gear reduction structure (6), and a second reverse gear reduction structure (7);

the geared motor (4), the gear reduction structure (5), and the first reverse gear reduction structure (6) are sequentially and drivably connected;

the output end of the gear reduction structure (5) is also used to drive the transmission member (3), and the transmission member (3) is used to drive the second reverse gear reduction structure (7);
a leg structure involved in the active leg (1) and the driven leg (2) includes a fitting tube (8), lifting tube (9), a grounding member (10), and a screw pair (11);
the fitting tube (8) is used to fit the geared motor (4), the gear reduction structure (5) and the first reverse gear reduction structure (6);
a screw (12) of the screw pair (11) is connected to an output end of the first reverse gear reduction structure (6) to realize a rotation of the screw (12) itself, a nut (13) of the screw pair (12) is used for connecting the lifting tube (9) to perform lifting movement of the lifting tube (9) relative to the fitting tube (8);
the grounding member (10) is detachably connected to the lifting tube (9) for ground support; and
the geared motor (4) has an overrunning clutch for gear transmission overload protection.

2. The double-lifting device according to claim 1, wherein the transmission member (3) comprises a first tube member (14) and a second tube member (15), the first tube member (14) and the second tube member (15) are nested with each other and the length adjustment of the transmission member (3) is realized in a pulling manner.

3. The double-lifting device according to claim 1, wherein the geared motor (4) comprises a motor (16) and a reducer (17) drivably connected to an output end of the motor (16), and the overrunning clutch is disposed in the reducer (17).

4. The double-lifting device according to claim 3, wherein the overrunning clutch comprises a mandrel (101) connected to the output end of the motor (16) and a clutch structure and a power output gear (102) socketed on the mandrel (101), the clutch structure including a power input gear (103), a steel ball (104), and a compression spring assembly;
the compression spring assembly includes a compression spring (105) and a fastening member (106) for locking the compression spring (105) on the mandrel (101); and
the steel ball (104) is placed between the compression spring (105) and the power input gear (103) to press the power input gear (103) under the action of the compression spring (105).

5. The double-lifting device according to claim 4, wherein a ball holder (107) socketed on the mandrel (101) is arranged between the compression spring (105) and the power input gear (103), the steel ball (104) is placed in the ball holder (107), and the steel ball (104) protrudes from the ball holder (107) at both ends.

6. The double-lifting device according to claim 4, wherein the fastening member (106) is configured as a nut sleeve screwed with the mandrel (101), the outer peripheral portion of the nut sleeve has a limiting step to limit the fixing end of the compression spring (105).

7. The double-lifting device according to claim 6, wherein the compression spring (105) is a hollow cone structure having an outer diameter of the fastening end smaller than an outer diameter of the pressing end.

8. The double-lifting device according to claim 5, wherein the end of the power input gear (103) has a female recess (108) to be matched with a part of the steel ball (104) extending from the ball holder (107) to fit the steel ball (104).

9. The double-lifting device according to claim 8, wherein the end of the power input gear (103) further has a plurality of arcuate chutes (109) connected to the female recess (108), and the plurality of arcuate chutes (109) are arranged in an annular array centering on the mandrel (101).

10. The double-lifting device according to claim 9, wherein the end of the power input gear (103) has a cavity (110), and the edge of the cavity (110) is adjacent to the outer edge portion of the power input gear (103).

11. The double-lifting device according to claim 4, wherein the power input gear (103) is axially restrained and sleeved on the mandrel (101).

12. The double-lifting device according to claim 1, wherein the gear reduction structure (5) comprises a fitting box (18) mounted on the fitting tube (8), a first transmission shaft (19) rotatably mounted on the fitting box (18) and drivingly connected to the output end of the reduction motor (4), and a first gear (20) set on the first transmission shaft (19) and a second gear (21) that meshes with the first gear (20).

13. The double-lifting device according to claim 12, wherein said first reverse gear reduction structure (6) comprises a second transmission shaft (22) arranged on the fitting tube (8) for mounting the second gear (21), a first bevel gear (23) mounted at one end of the second transmission shaft (22), and a second bevel gear (24) that engages the first bevel gear (23), the second transmission shaft (22) extends beyond the other end of the second gear (21) for mounting the transmission member (3), the second bevel gear (24) is mounted on the top of the corresponding screw (12) to drive the screw (12) to rotate.

14. The double-lifting device according to claim 13, wherein said second reverse gear reduction structure (7) comprises a third transmission shaft (25) connected to the transmission member (3), a third bevel gear (26) mounted on the third transmission shaft (25), and a fourth bevel gear (27) meshed with the third bevel gear (26), and the fourth bevel gear (27) is mounted on the top of the corresponding screw (12) to drive the screw (12) to rotate.

15. The double-lifting device according to claim 1, wherein the grounding member (10), the lifting tube (9) and the fitting tube (8) are hollow and sequentially fitted from inside to outside.

16. The double-lifting device according to claim 15, wherein the fitting tube (8) has a mounting seat (28) for the corresponding screw (12) to be arranged on rotatably.

17. The double-lifting device according to claim 15, wherein the grounding member (10) and the lifting tube (9) are detachably connected through positioning pull pins (30) and pin holes (29) provided on the grounding member (10) and the lifting tube (9) respectively.

18. The double-lifting device according to claim 12, wherein the exposed end of the first transmission shaft (19) is detachably fitted with a hand crank (31).

19. The double-lifting device according to claim 1, wherein the bottom end of the grounding member (10) has a radially expanding support base (32), and the grounding member (10) and the support base (32) are detachably connected.

* * * * *